shown

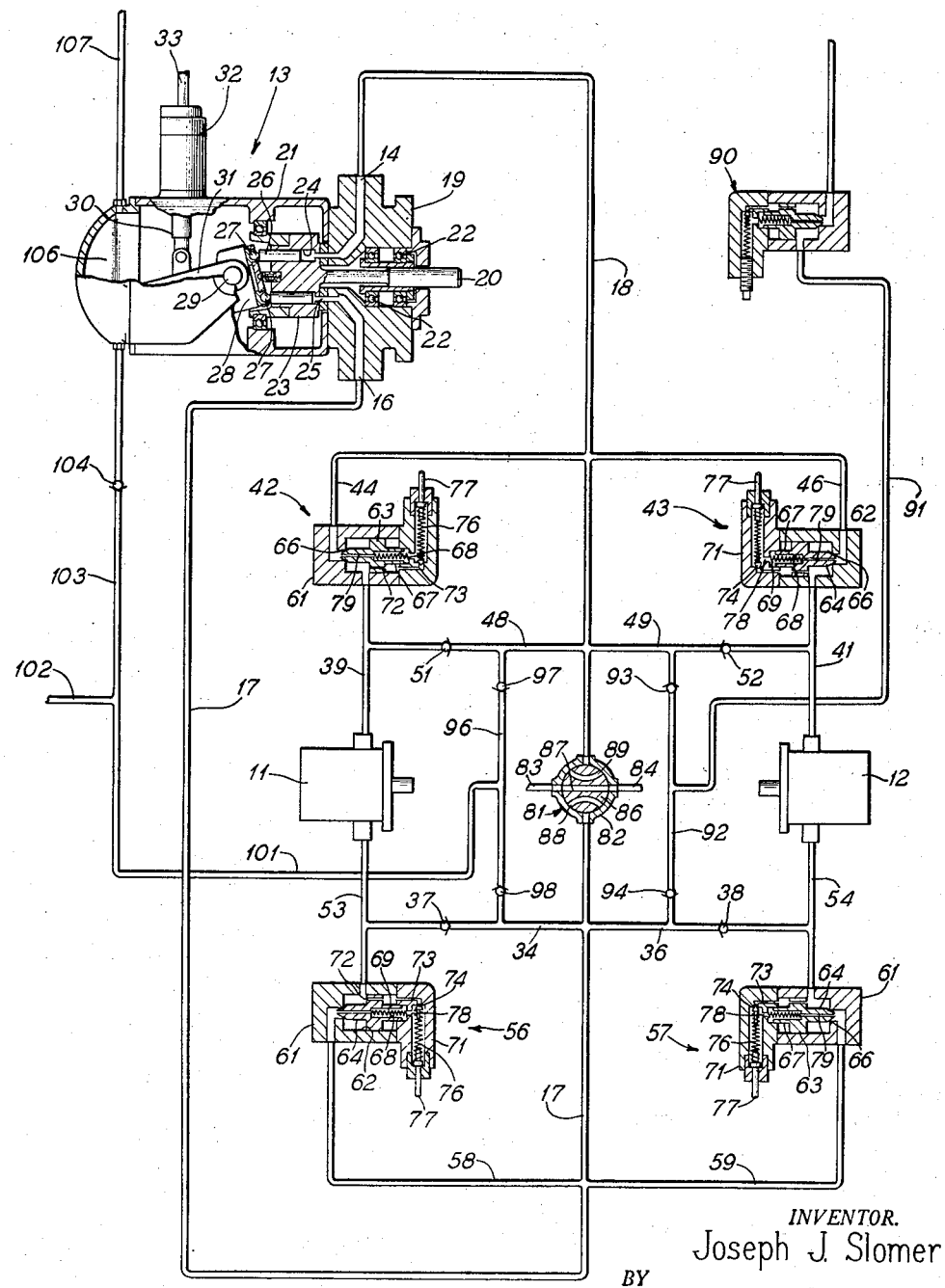

United States Patent Office 2,876,623
Patented Mar. 10, 1959

2,876,623

VALVE ARRANGEMENT FOR REGULATING MULTIPLE MOTORS INDEPENDENTLY IN A PUMP AND MOTOR SYSTEM

Joseph J. Slomer, Chicago, Ill., assignor to Goodman Manufacturing Company, Chicago, Ill., a corporation of Illinois Application March 1, 1956, Serial No. 568,836

1 Claim. (Cl. 60—53)

This invention relates generally to hydraulic circuits for controlling the tramming of heavy crawler tread operated vehicles, and relates generally to an improved circuit whereby operation can be achieved over a wide range of speeds.

The invention herein is particularly adapted for use with crawler tread mounted boring type miners of the general type as may be shown in Robbins Pat. No. 2,705,624, issued April 5, 1955 for Coal Mining Machine with Collapsible Head. Such machines are required at times to be trammed rapidly from one working face to another. Moreover, they are required to move at very low speeds for crowding of the boring arms against the working face. The hydraulic circuit for controlling the tramming of such machines must, therefore, operate to give a wide range of speeds.

One of the principal objects of this invention is to provide an improved hydraulic circuit for a fluid motor powered crawler tread vehicle whereby the vehicle can operate through a wide range of speeds.

Another object is to provide a fluid pressure circuit having a pump operable to supply varying quantities of pressure fluid in accordance with varying speeds of the motors operated thereby, the output being augmented by the output from a constant delivery pump when it is desired to tram at higher speeds.

Another object is to provide a circuit in which additional working fluid can be readily supplied to replace the leaks to a closed system, such fluid being circulated to cool a variable volume pump of the circuit.

Other objects and important features of the invention will be apparent from a study of the drawing taken with the description, which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and spirit of the subjoined claims.

In the drawing:

The single figure shows a control circuit for a pair of tramming motors for a mine vehicle or the like, said control circuit embodying the improvements according to the present invention.

Referring now to the drawing there is shown a pair of tramming motors 11 and 12 for a mine vehicle or the like. Tramming motors 11 and 12 are reversible in operation and are supplied with motive fluid by a reversible variable volume pump 13 having an intake port 14 and a working or output port 16. The two ports 14 and 16 are reversed in their function according to the setting of the pump 13 and according to whether the tramming motors 11 and 12 are operated in the forward or reverse directions. The working port 16 is connected to the fluid motors 11 and 12 by means of a pressure line 17, and fluid is exhausted from the motors 11 and 12 by means of a return line 18 connected to the intake port 14.

The variable volume pump 13 includes a pump housing 19 and a control housing 21. A drive shaft 20 is mounted upon bearings 22 to turn in the housing 19. Any suitable means, not shown, may be provided to supply power to the shaft 20 to rotate same. A pump rotor 23 is mounted to turn with the shaft 20 and extends within the control housing 21, and is provided with bores 24 receiving pistons 26 having ball and socket ends 27 carried in a wobble plate 28. The wobble plate 28 controls the length of the stroke of the pistons 26 to vary the volume swept thereby and delivered to piston ports 25 connected to the working port 16.

Means are provided to pivot the wobble plate 28 about a pivot point 29 to vary the stroke of the pistons 26, and also to effect a reversal of delivery from pump 13. The wobble plate accordingly has an arm 31 connected by a link 30 to a slave motor 32 having a pressure line 33 to any convenient control point. The slave motor 32 accordingly rocks the wobble plate 28 to positions for the purposes previously described.

The pressure line 17 is connected to the tramming motors 11 and 12 by means of lines 34 and 36 branching therefrom. Lines 34 and 36 have check valves 37 and 38 respectively therein allowing the fluid to move therepast to supply the tramming motors 11 and 12. Each of the tramming motors 11 and 12 is provided respectively with exhaust lines 39 and 41 connected to adjustable throttling valves 42 and 43 respectively. Check valves 51 and 52 in branching lines 48 and 49 from the line 18 are blocked so that the fluid exhausted from the motors 11 and 12 must pass through the valves 42 and 43.

Each of the throttling valves 42 and 43 is adjusted to control the amount of fluid discharged by its associated motor 11 or 12, and the exhaust fluid from the motors 11 and 12 passes through the valves 42 and 43 and lines 44 and 46 to the return line 18.

Upon reversal of the variable volume pump 13, at which time the fluid motors 11 and 12 are also reversed in direction, the working port 16 of the pump 13 becomes an intake port, and the intake port 14 becomes a working port to supply pressure fluid to the line 18 to supply the motors 11 and 12. The lines 48 and 49 branch from the line 18 and have the check valves 51 and 52, respectively, therein to bypass the throttling valves 42 and 43, the discharged fluid from the motors 11 and 12 exhausting from said motors by means of lines 53 and 54, the back pressure against the fluid motors 11 and 12 being controlled by throttling valves 56 and 57 respectively. Under this condition the check valves 37 and 38 are blocked so that the exhaust fluid from motors 11 and 12 must pass through the throttling valves 56 and 57.

The two throttling valves 56 and 57 are each provided with return lines 58 and 59 which branch from the line 17, which in this condition of operation provide a return to the variable volume pump 13.

Each of the throttling valves 42, 43, 56 and 57 consists of a valve body 61 having a bore 62 therein. A piston type valve member 63 is slidable in the bore 62 and has a pilot extension 64 arranged to seat at 66 in the valve body 61. The piston 63 has an extension 67 which is bored as at 68 to receive a spring 69 which is bottomed against a cap 71 for the valve body 61.

The pressure at which the pilot extension 64 moves from its seat 66 is determined by a bore 72 in the piston 63 which connects with a bore 73 in the cap 71. The bore 73 is closed by a poppet 74 urged by a spring 76 to close on the bore 73, the pressure on the spring 76 being regulated by moving a plunger 77 bearing against the spring 76 and supported in the housing 71. A bore 78 in the cap 71 communicates with a bore 79 in the pilot extension 64 to bleed pressure from behind the piston 63 to the line 59.

The throttling valves 42, 43, 56 and 57 determine or limit the back pressure against the motors 11 and 12 on the exhaust side thereof to limit or regulate the amount of working fluid discharged thereby. The amount of such back pressure is determined by the setting of the spring 76. When the back pressure on the exhaust side of the fluid motors 11 and 12 is in excess of an amount as determined by the setting of the spring 76 pressure will be bled off behind the piston 63 by cracking of the poppet 74, which bleeds such excess of pressure behind the piston 63 through the passageway 79 to tank. This creates an unbalance of pressure across the piston 63 causing its pilot extension 64 to move from the seat 66, to reduce the back pressure against the fluid motor 11 or 12 to a desired value.

It will thus be noted that throttling valves 42 and 43 may be regulated in one direction of operation of the variable volume pump 13 and of the tramming motors 11 and 12 so as to vary the amount of fluid discharged by the tramming motors 11 and 12 to control the direction of the vehicle to which the motors are connected. Conversely, the valves 56 and 57 may be operated when the variable volume pump 13 is operating in the opposite direction, and the fluid motors 11 and 12 are operating in a corresponding direction, the amount of fluid discharged by the fluid motors 11 and 12 being regulated by the valves 56 and 57 to effect steering of the vehicle to which they are connected.

In mechanical miners in the type as disclosed in the aforesaid Robbins patent, the crowding of the boring arms shown in said patent may be regulated by the setting of the variable volume pump 13 as determined by the slave motor 32 cooperating with the wobble plate 28, the direction of feed movement of the miner being controlled nicely by the setting of the valves 42 and 43 or the valves 56 and 57 depending upon the forward direction of movement of the motors 11 and 12.

Under certain conditions of operation, as for tramming the machine from one working face to another at remotely disposed points in a mine or the like, the output from the variable volume pump 13 may be augmented so as to achieve higher speeds for such tramming. To this end the two lines 17 and 18, which alternate as pressure lines and return lines according to the direction of operation of the variable pump 13 have connected therebetween a valve 81.

Valve 81 includes a valve body 82 having connected thereto a line 83 to a source of fluid under pressure, as for example to a pump having a fixed volumetric capacity. The valve body 82 is also connected to a tank by return line 84. The valve body has a rotatable valve element 86 therein with a passage 87 therethrough connecting line 83 with the tank line 84. The valve is also shiftable to a position connecting a passageway 88 therein to the pressure line 83 and the working line 17. Under such condition the passageway 89 in the rotatable valve member 86 connects the exhaust line 18 to the tank line 84.

Means are also provided for maintaining the system under a predetermined limit of pressure, and to this end there is provided a pressure relief valve indicated generally by the reference numeral 90, and connected by a line 91 to a line 92 in parallel with the two lines 17 and 18. Line 92 has a pair of check valves 93 and 94 therein each being of an opposite sense to the other, and being arranged to open under the influence of the pressure in excess of a desired amount and as determined by the pressure relief valve 90. Pressure relief valve 90 may be of any desired form and may be arranged to give any desired upper limit of pressure to the circuit.

Means are also provided to replace any working fluid lost to the system by leakage through any of the valves, motors or pumps shown, and to this end there is provided a line 96 also connected in parallel to the working line 17 and 18. Line 96 has a pair of spaced check valves 97 and 98 therein, of opposite sense, the portion of the line 96 intermediate the check valve 97 and 98 being connected by a line 101 to a pressure line 102 and to an auxiliary source of pressure fluid. Pressure line 102 is also connected to a line 103 and past a check valve 104 to a chamber 106 of the control housing 21, the fluid in the line 102 being employed as a coolant for the variable volume pump 13. Fluid is exhausted from the chamber 106 by means of a line 107.

Check valve 104 is adjusted to open at a pressure which is slightly greater than the pressure necessary to open check valve 97 or 98.

Under conditions when line 17 is a working line at high pressure line 18 becomes an exhaust line. Loss of fluid in the system, which would tend to make the exhaust line 18 operate below a desired back pressure, will cause the check valve 97 to open to replenish fluid to the system. Contrari-wise, when line 18 is a pressure line and line 17 is an exhaust line valve 98 opens to supply fluid to replenish the system.

While the invention has been described in terms of a preferred embodiment thereof its scope is intended to be limited only by the claim here appended.

I claim as my invention:

A hydraulic circuit comprising a reversible pump, a first pressure line in fluid circuit with one side of the pump, a second pressure line in fluid circuit with the other side of the pump, means for reversing the direction of fluid flow through the first and second pressure lines, a first fluid motor and a second fluid motor in parallel with each other, a first branch line and a second branch line in parallel with each other and in fluid circuit between the first pressure line and the first fluid motor, a first adjustable throttling valve in the first branch line, a first check valve in the second branch line, a third branch line and a fourth branch line in parallel with each other and in fluid circuit between the first pressure line and the second fluid motor, a second adjustable throttling valve in the third branch line, a second check valve in the fourth branch line, a fifth branch line and a sixth branch line in parallel with each other and in fluid circuit between the first fluid motor and the second pressure line, a third adjustable throttling valve in the fifth branch line, a third check valve in the sixth branch line, a seventh branch line and an eight branch line in parallel with each other and in fluid circuit between the second fluid motor and the second pressure line, a fourth adjustable throttling valve in the seventh branch line, a fourth check valve in the eighth branch line, the first and second check valves opening to fluid flow through the circuit in one direction, the third and fourth check valves closing to fluid flow through the circuit in said one direction, means for adjusting the first and third throttling valves thereby to regulate operation of said first fluid motor, and means for adjusting the second and fourth throttling valves thereby to regulate operation of said second fluid motor, the last two means being operable independently of each other.

References Cited in the file of this patent

UNITED STATES PATENTS

| | | |
|---|---|---|
| 2,042,247 | Blood | May 26, 1936 |
| 2,223,715 | Berger | Dec. 3, 1940 |
| 2,336,911 | Zimmermann | Dec. 14, 1943 |
| 2,650,573 | Hickman | Sept. 1, 1953 |

UNITED STATES PATENT OFFICE

CERTIFICATE OF CORRECTION

Patent No. 2,876,623                       March 10, 1959

Joseph J. Slomer

It is hereby certified that error appears in the printed specification of the above numbered patent requiring correction and that the said Letters Patent should read as corrected below.

Column 4, line 52, for "eight branch" read -- eighth branch --.

Signed and sealed this 7th day of July 1959.

(SEAL)
Attest:

KARL H. AXLINE                         ROBERT C. WATSON
Attesting Officer                    Commissioner of Patents